United States Patent Office 2,961,544
Patented Nov. 22, 1960

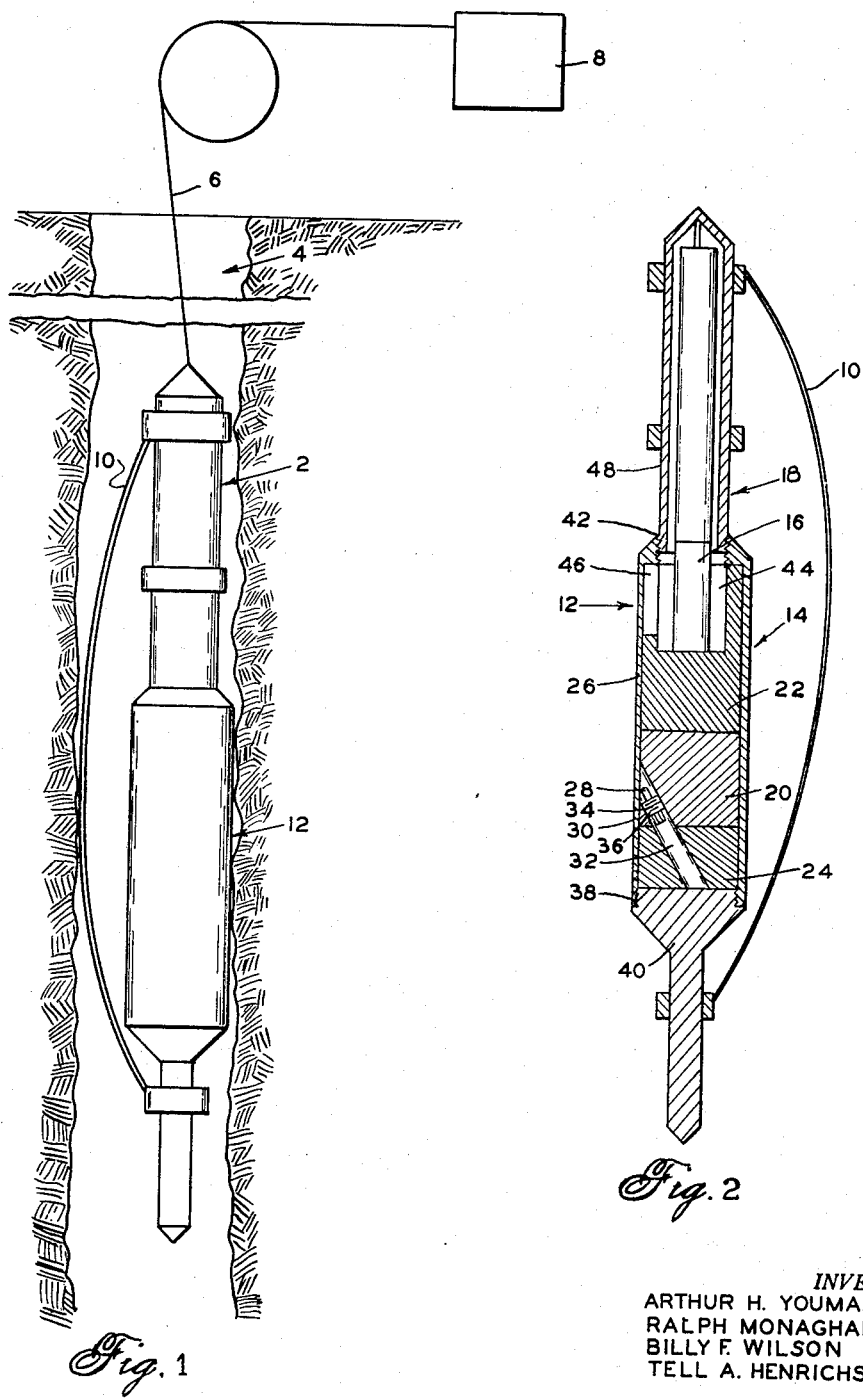

2,961,544

SOURCE SHIELD FOR DENSITY LOGGING INSTRUMENTS

Arthur H. Youmans, Ralph Monaghan, Billy F. Wilson, and Tell A. Henrichs, Tulsa, Okla., assignors to Well Surveys, Incorporated, a corporation of Delaware Filed Aug. 2, 1956, Ser. No. 601,807

2 Claims. (Cl. 250—108)

This invention relates to radioactivity well logging and more particularly to a novel source shield for radioactivity density logging.

It has been found that, if the formations surrounding a well are irradiated with gamma rays, some of the gamma rays will be absorbed by the rock while other gamma rays will be scattered about and some will be sufficiently scattered so as to return to the well. As might be expected, the denser rock formations tend to absorb more gamma rays than less dense formations. Thus, the number of scattered gamma rays returning to the well is substantially inversely proportional to the density of the adjacent formations. Consequently, by traversing a well with an instrument containing a source of gamma rays and a gamma ray detector and recording the detector output as a function of depth, a record or log may be made showing the density characteristics of the formations penetrated by the well.

Unfortunately, density logging is not quite as simple as one might expect from the foregoing paragraph. The detector must be shielded from the source so gamma rays cannot pass directly from the source to the detector. Moreover, since the fluids in the well are, obviously, considerably less dense than the formations, gamma rays can travel much more easily through the well than through the formations. Therefore, the log will be strongly affected by borehole diameter, the presence and density of well fluids, the distance from the instrument to the wall of the well and other similar parameters. These are referred to collectively as "borehole effect."

To overcome these effects, it has been the practice heretofore to surround the source and detector with lead with windows formed through the shielding adjacent the source and detector on one side of the instrument and to provide means to urge that side of the instrument against the wall of the well. In this way, the number of gamma rays which can pass through the well to create "borehole effect" is restricted while those gamma rays which pass through the formations are relatively unhindered.

While such devices have improved the prior art density logging instruments, they still have not been entirely satisfactory. The lead used for shielding is relatively plastic and may become deformed when subjected to the pressures encountered in wells of several thousand feet depth. Consequently, it is customary to enclose the instrument in a thick steel housing. However, the steel housing absorbs and scatters a substantial quantity of gamma rays. Therefore, the number of gamma rays which are available to provide information is greatly reduced.

Furthermore, the prior art density logging instruments have been formed with a recess extending perpendicularly inward from the face of the instrument to house a capsule containing the gamma ray source. The capsule was retained in the recess by a threaded plug or other suitable means. However, this construction requires that the source be recessed a considerable distance from the face of the instrument whereas applicants have found that, for best results, the source should be as close as possible to the face of the instrument. In addition, the source material is difficult and dangerous to handle. Therefore, actual position of the radioactive material usually varies from one capsule to another and may be free to move axially within the capsule. Consequently, even if the capsule were positioned with extreme accuracy, the operator could not know precisely the distance from the source to the instrument face and, even if he could, it might change at any time and the operator would not know it. Obviously, if the position of the source changed during a logging operation, the reliability of the log would be affected.

These disadvantages of prior art density logging instruments are overcome with the present invention and an instrument is provided wherein the thickness of the steel housing required is materially reduced without sacrificing compressive strength. Moreover, the device of the present invention permits the source to be located immediately adjacent the face of the instrument and allows the operator to know the position of the source material more accurately while reducing the criticality of the positioning of the source material. Furthermore, the device of the present invention protects the source capsule from damage due to pressure and prevents the possibility of radioactive contamination of the well fluids while making it possible to reduce the danger from radiation to persons handling the instrument or loading or unloading the source.

The advantages of the present invention are preferably attained by providing a novel source shield which employs shielding material adjacent the source which is denser but less plastic than lead and wherein the source capsule is located immediately adjacent the face of the instrument and is oriented with its axis substantially parallel to the axis of the instrument. Moreover, the source shield of the present invention may be attached to conventional well logging instruments to permit their use for density logging.

Accordingly, it is an object of the present invention to provide a novel source shield for density logging instruments which employs shielding material adjacent the source which is denser but less plastic than lead.

Another object of the present invention is to provide a novel source shield for density logging instruments wherein the steel housing required may be much thinner than has been possible heretofore.

A further object of the present invention is to provide a novel source shield for density logging instruments wherein the source capsule is located immediately adjacent the face of the instrument.

An additional object of the present invention is to provide a novel source shield for density logging instruments wherein the position of the source may be accurately determined.

Another object of the present invention is to provide a novel source shield which may be attached to conventional well logging instruments to permit their use in density logging.

These and other objects and features of the present invention will be apparent from the following description wherein reference is made to the figures of the accompanying drawing.

In the drawing:

Figure 1 is a view, partly in section, through a portion of the earth showing a typical density logging instrument embodying the present invention suspended in a well, and Figure 2 is a section through the instrument of Figure 1.

In that form of the invention chosen for purposes of illustration in the drawing, Figure 1 shows a density logging instrument 2 suspended in a well 4 by means of a cable 6 which serves to raise and lower the instrument 2 to traverse the well 4 and which also serves to transmit electrical signals from the instrument 2 to a recording device 8 at the surface of the earth. The instrument 2 is provided with a skid 10 which serves to urge one face 12 of the instrument 2 against the wall of the well 4.

As seen in Figure 2, the instrument 2 comprises a source shield 14, a detector 16 and an electronic portion 18. The detector 16 and electronic portion 18 are substantially identical with similar portions of conventional radioactivity well logging instruments. Thus, the detector 16 may be of any suitable or desired type, such as an ionization chamber, proportional counter, Geiger-Müller counter or scintillation counter, and the electronic portion 18 houses the amplifiers, power supplies and other necessary or desirable electronic equipment.

The source shield 14 has a central portion 20 and upper and lower portions 22 and 24 respectively enclosed within a protective outer housing 26 which may be made of strong steel to withstand the tremendous pressure encountered in wells of several thousand feet or more. The central portion 20 of the source shield 14 is preferably composed of a material which is denser but less plastic than lead, such as a sintered copper-tungsten alloy or the like. Such a material will provide good gamma ray shielding due to its high density and will be better able to withstand the great pressures encountered than lead shielding. As pointed out above, the housing 26 is preferably formed of strong steel alloys. However, such alloys tend to scatter gamma rays considerably and affect the accuracy of the log. On the other hand, when a material, such as a copper-tungsten alloy, is used for shielding, the thickness of the housing 26 may be materially reduced adjacent the source capsule 28, as seen at 30, without substantially altering the compressive strength of the instrument. In this way, the source capsule 28 may be located immediately adjacent the face 12 of the instrument but will be protected against damage by the pressure in the well which might result in contamination of the well fluids. To house the source capsule 28, a hollow tube 32 extends upwardly from the lower surface of the portion 24 through the lower portion 24 to about the middle of the central portion 20. In addition, the tube 32 is inclined so that the upper end 34 thereof communicates with the inside of the housing 26 on the face 12 of the instrument 2 at about the center of the area of reduced thickness 30. The upper end 34 of tube 32 is preferably threaded and the gamma ray source capsule 28 is inserted in the tube 32 and secured adjacent the end 34 of the tube by suitable means, such as a threaded plug 36.

The inclination of tube 32 permits the source capsule 28 to be urged into intimate relation with the inner surface of the housing 26 in the area of reduced thickness 30 adjacent face 12 of the instrument 2 thereby assuring that a maximum amount of radiation is directed into the formations and, consequently, increasing the amount of information carrying radiation available for the detector 14. The tube 32 is preferably of such diameter that the source capsule 28 must be inserted axially. In this way, when the instrument is in a vertical position, as it will be when suspended in a well, the capsule 28 will be standing on end and if the radioactive material is loose, gravity will cause it to rest in the lower end of the capsule. Consequently, regardless of the length of the capsule 28 the position of the radioactive material may readily be determined with considerable accuracy. Furthermore, jarring or rough handling of the instrument will not alter the position of the capsule 28. Moreover, it has been found that variations in the vertical position of the source material have much less effect on the log than lateral variations.

Another advantage which accrues to this method of positioning the source capsule 28 is that, while shielding is virtually non-existent adjacent face 12 of the instrument, the sides and back have considerably more shielding than any side of the instruments of the prior art. Therefore, by setting the instrument down with face 12 in contact with the ground or by keeping face 12 directed away from any one handling the instrument, the dangers from exposure to radiation are materially reduced. Thus, the insertion and removal of the source capsule 28 are made safer. If desired, face 12 of the instrument may be provided with bead welds or other indicia to make it easily recognizable. On the other hand, since only one side of the instrument is unshielded, it is simple to provide a removable shield which may be secured over face 12 when the instrument is not in use.

As stated above, tube 32 extends completely through the lower portion 24 of the source shield 14 to permit the source capsule 28 to be inserted therethrough to its proper location adjacent the face 12 of the instrument 2 midway through the central portion 20. The area about the tube 32 may be filled with shielding material to prevent gamma rays from passing downward into the well and possibly adding to borehole effect. Lead is preferably used as the shielding material in the lower portion 24 as it provides good shielding due to its high atomic number and is less expensive than the copper-tungsten alloy employed in the central portion 20 and may be worked more easily.

The lower end 38 of the housing 26 is preferably threaded so as to permit attachment thereto of suitable closure means such as a cap or a lower slider assembly 40 for skid 10, such as described in the copending application of Monaghan and Youmans, Ser. No. 597,136, filed July 11, 1956. Such means serve to prevent loss of the source capsule 28 in the event plug 36 should become loosened and further prevent damage to the lower end of tube 32.

The upper portion 22 of the source shield 14 is preferably filled with a shielding material, such as lead, to provide gamma ray shielding between the source capsule 28 and the detector 16. As seen in Figure 2, the upper portion 22 of the source shield 14 is formed with a recess 44 therein to receive the detector 16 and a window 46 is formed through the gamma ray shielding communicating with the recess 44 adjacent the detector 16 on the face 12 of the instrument. In this way, gamma rays from the well, which would cause borehole effect, are prevented by the shielding from reaching the detector 16 while gamma rays from the formations adjacent face 12 of the instrument can pass through the window 46 and, thus, reach detector 16 quite easily.

The electronic portion 18 of the instrument 2 is located within a protective housing 48 which is preferably of lesser diameter than the housing 26 of the source shield 14. The housing 48 may be formed of the same material as the housing 26 and the two may be secured together by any suitable means, such as threads 42.

With most conventional radioactivity well logging instruments, for example, those used for making natural gamma ray, induced gamma ray or neutron-gamma ray logs, housing of the same diameter as the housing 48 is provided about the gamma ray detector. However, this housing is generally threaded or otherwise secured to the housing about the electronic portion of the instrument in substantially the same manner as described above for securing the source shield 14 to the housing 48 about electronic portion 18. Therefore, to convert one of the conventional radioactivity well logging instruments for use in density logging, all that need be done is to remove the housing about the detector and replace it with the source shield of the present invention. Moreover, with small diameter instruments, the housing about the detector may be left in place and the source shield may simply be slipped over the end of the instrument and secured in any suitable manner. Consequently, it is no longer necessary for the operator to carry several conventional instruments plus several density logging instruments as the same thing can be accomplished by carrying one set of conventional instruments and one or more of the source shields of the persent invention. Thus, the space required in a logging truck for carrying instruments is reduced by nearly fifty percent.

It will be obvious to one skilled in the art that the specific materials named herein are not critical and that other materials may be substituted provided that the characteristics described are retained. Moreover, the angle of inclination of tube 32 may be varied considerably.

Numerous other variations and modifications may also be made without departing from the invention. Accordingly, it should be clearly understood that the form of the invention described above and shown in the figures of the accompanying drawing are illustrative only and are not intended to limit the scope of the invention.

What we claim is:

1. A novel shielded source assembly for use with radioactivity well logging instruments having a gamma ray detector, said shielded source assembly being independent of said instruments and comprising a housing, shielding material substantially opaque to gamma rays filling said housing, a tube extending through said shielding from immediately adjacent one side of said housing to one surface of said shielding material, said tube being inclined with respect to the axis of said source assembly, and means securing a gamma ray source in said tube immediately adjacent said housing, a recess formed in one end of said source assembly and extending axially of said source assembly for receiving the detector of said well logging instrument, and means for securing said source assembly to said instrument.

2. An instrument for determining the density of formations surrounding a borehole, said instrument comprising a cylindrical housing, means carried by said housing serving to urge one side of said housing into engagement with the wall of the borehole, shielding material substantially opaque to gamma rays disposed within said housing, a gamma ray source unit, a tube extending through said shielding material from immediately adjacent said one side of said housing to the surface of one end of said shielding material, said tube being inclined with respect to the axis of said housing and open at said surface to permit insertion of said source unit, means securing said source unit in said tube immediately adjacent said one side of said housing, a gamma ray detector, a recess of sufficient size to receive said detector formed in the other end of said shielding material, said detector being mounted in said recess, and a window formed of material substantially transparent to gamma rays communicating with said recess and extending through said shielding material to said one side of said housing.

References Cited in the file of this patent
UNITED STATES PATENTS

| | | |
|---|---|---|
| 2,711,482 | Goodman | June 21, 1955 |
| 2,727,155 | Herzog et al. | Dec. 13, 1955 |
| 2,769,918 | Tittle | Nov. 6, 1956 |